(12) United States Patent
Lee

(10) Patent No.: US 9,273,707 B2
(45) Date of Patent: Mar. 1, 2016

(54) FEMALE-MALE COMBINATION TYPE ORNAMENT

(71) Applicants: Seong Hwan Lee, Uijeongbu-si, Gyeonggi-do (KR); You Han Lee, Namyangju-si, Gyeonggi-do (KR)

(72) Inventor: Seong Hwan Lee, Uijeongbu-si (KR)

(73) Assignees: Seong Hwan Lee, Uijeongbu-Si, Gyeonggi-Do (KR); You Han Lee, Namyangju-Si, Gyeonggi-Do (KR)

( * ) Notice: Subject to any disclaimer, the term of this patent is extended or adjusted under 35 U.S.C. 154(b) by 74 days.

(21) Appl. No.: 14/149,080

(22) Filed: Jan. 7, 2014

(65) Prior Publication Data

US 2015/0192156 A1    Jul. 9, 2015

(51) Int. Cl.
*E04B 1/26* (2006.01)
*F16B 3/00* (2006.01)
*A44B 13/00* (2006.01)

(52) U.S. Cl.
CPC ................. *F16B 3/00* (2013.01); *A44B 13/007* (2013.01); *Y10T 403/7045* (2015.01)

(58) Field of Classification Search
CPC ................... Y10T 403/7039; Y10T 403/7045; Y10T 403/7051; Y10T 403/7052; Y10T 403/7064; Y10T 16/05; F16B 3/00; A44B 13/007
USPC ........... 403/265–267, 359.1, 359.6, 361, 364, 403/367, 368, 374.1; 16/2.1, 2.2
See application file for complete search history.

(56) References Cited

U.S. PATENT DOCUMENTS

| | | | | | |
|---|---|---|---|---|---|
| 3,091,795 | A | * | 6/1963 | Budwig | 16/2.1 |
| 3,805,552 | A | * | 4/1974 | Heald | 464/162 |
| 4,400,856 | A | * | 8/1983 | Tseng | 24/590.1 |
| 4,845,819 | A | * | 7/1989 | Kyomen et al. | 29/890.126 |
| 5,069,586 | A | * | 12/1991 | Casey | 411/339 |
| 5,538,474 | A | * | 7/1996 | Kretschmer et al. | 464/162 |
| 5,575,601 | A | * | 11/1996 | Skufca et al. | 411/339 |
| 5,626,435 | A | * | 5/1997 | Wohlhuter | 403/348 |
| 5,950,277 | A | * | 9/1999 | Tallmadge et al. | 16/2.1 |
| 6,302,617 | B1 | * | 10/2001 | Rumpp | 403/348 |
| 6,328,513 | B1 | * | 12/2001 | Niwa et al. | 411/339 |
| 7,065,963 | B2 | * | 6/2006 | Niwa | 60/323 |

(Continued)

FOREIGN PATENT DOCUMENTS

| JP | 2005-046615 A | 2/2005 |
|---|---|---|
| KR | 10-2008-0041915 | 5/2008 |

(Continued)

*Primary Examiner* — Gregory Binda
*Assistant Examiner* — Nahid Amiri
(74) *Attorney, Agent, or Firm* — patenttm.us

(57) ABSTRACT

A female-male combination type ornament with easily coupled male and female members and a coupling state between the female and male member is more stably and firmly maintained. The female-male combination type ornament includes a female member having a plurality of insertion grooves formed at predetermined intervals in an inner circumferential surface of a hollow of a first tubular body. A first color is integrally formed on a lower rim of the first tubular body; and a male member correspondingly coupled to the female member is configured such that a plurality of insertion projections that are inserted into the plurality of insertion grooves in a crammed manner are formed at predetermined intervals on an outer circumferential surface of a second tubular body that is inserted into the hollow of the first tubular body and a second color is integrally formed on an upper rim of the second tubular body.

6 Claims, 13 Drawing Sheets

(56) References Cited

U.S. PATENT DOCUMENTS

| | | |
|---|---|---|
| 8,122,519 B2 * | 2/2012 | Schmelzer et al. .............. 2/170 |
| 8,123,815 B2 * | 2/2012 | Meridew et al. ........... 623/22.29 |
| 8,228,625 B2 * | 7/2012 | Sano .............................. 359/827 |
| 8,402,605 B2 * | 3/2013 | Courtin et al. ...................... 16/4 |
| 8,991,006 B2 * | 3/2015 | Masanek, Jr. ....................... 16/4 |
| 2009/0126148 A1 * | 5/2009 | Tripont ............................ 16/2.1 |

FOREIGN PATENT DOCUMENTS

| | | |
|---|---|---|
| KR | 10-1165164 | 7/2012 |
| KR | 10-1229936 | 2/2013 |

* cited by examiner

FEMALE-MALE COMBINATION TYPE ORNAMENT

BACKGROUND

1. Field of the Invention

The present invention relates to a female-male combination type ornament, and more particularly to a female-male combination type ornament in which a male member and a female member can be easily coupled and a coupling state between the female member and the male member can be more stably and firmly maintained.

2. Discussion of Related Art

In general, in order to display brands, logos, or emblems, to increase salability of a product by providing a luxurious decorative effect and beautifying an appearance, or to connect members such as bag straps, rings, or handles, various ornaments are attached to various fashion items or personal belongings such as handbags, wallets, bags, belts, hats, shoes, or clothes.

Methods of fixedly attaching an ornament to any of various target objects including a bag may be roughly classified into methods of directly adhering an ornament using an adhesive and methods of physically coupling an ornament by forming holes in a target object, inserting female and male ornaments into the holes in opposite directions, and coupling the female and male ornaments using screws or a compressive force.

Among these, methods of directly adhering an ornament using an adhesive have problems in that an adhesive force is reduced due to an external force applied to the ornament, restrictions according to characteristics of a material of the target object, or washing, and thus the ornament tends to be easily detached after a predetermined period of time passes.

Also, methods of physically coupling female and male ornaments using screws have problems in that, since an operator has to fasten and fix each of the screws, an operation is cumbersome and delicate, work efficiency and productivity are reduced, and when an external force is applied in use, the screws come loose and are separated. Further, in methods of physically coupling female and male ornaments using a compressive force, an additional compression tool or an additional press device has to be used. Since a coupling state between the female and male ornaments is maintained only due to a simple frictional force, when an external force is applied, cracks form and the female and male ornaments may easily rotate or move. In addition, the female and male ornaments are worn down, noise is generated, the female and male ornaments are detached and separated from the target object, and thus the target object is disfigured.

A "combination type ornament" disclosed in Korean Patent No. 10-1165164 that is one example of the method of physically coupling the female and male ornaments includes a front body 30 having a rear surface from which a coupling unit 31 protrudes, and a rear body 40 having a front surface from which a coupling unit 41 that is correspondingly coupled to the coupling unit 31 protrudes. A projection 32 is formed on an outer circumferential surface of the coupling unit 31 of the front body 30, and a groove (not shown) that is correspondingly coupled to the projection 32 is formed in an inner circumferential surface of the coupling unit 41 of the rear body 40.

Also, in order to firmly couple the coupling unit 31 of the front body 30 to the coupling unit 41 of the rear body 40 in a crammed manner, the coupling unit 31 of the front body 30 and the coupling unit 41 of the rear body 40 are formed to have no assembly tolerance between sizes of the outer circumferential surface of the coupling unit 31 of the front body 30 and the inner circumferential surface of the coupling unit 41 of the rear body 40.

The combination type ornament (hereinafter referred to as a conventional ornament) is formed using a shape-forming method such as die casting, and then is subjected to surface treatment that is a process of forming a thin film of gold or silver using electroplating in order to create a luxury image and a precious metal image, provide a gloss effect, and improve corrosion resistance.

However, the conventional ornament has the following problems. Since the coupling state between the front body 30 and the rear body 40 is maintained only due to a simple frictional force, when an external force such as an external impact is applied to the conventional ornament, cracks may form and the conventional ornament may easily rotate and move. As a contact portion is worn away due to a frequent external force, noise is generated. In addition, the front body 30 is easily detached and separated from the rear body 40 along a central axis, thereby disfiguring the target object.

Also, since the electroplating is performed as a post-process, a total thickness is slightly increased due to a plating layer that is formed after plating. In particular, since a plating film is unevenly additionally applied to edge portions of the coupling unit 31 of the front body 30 and the coupling unit 41 of the rear body 40 due to a current difference that occurs during the electroplating, a thickness of the plating layer is further increased, and thus the coupling state between the coupling unit 31 of the front body 30 and the coupling unit 41 of the rear body 40 is badly affected and the coupling unit 31 of the front body 30 and the coupling unit 41 of the rear body 40 are not easily engaged with each other.

Furthermore, since the conventional ornament maintains an assembly and coupling state between the coupling unit 31 of the front body 30 and the coupling unit 41 of the rear body 40 only using the frictional force between the coupling unit 31 of the front body 30 and the coupling unit 41 of the rear body 40, a fixing force is less than that of a typical method using a compressive force.

Prior Art Documents

Patent Documents

Korean Patent No. 10-1165164 (11 Jul. 2012)
Korean Patent No. 10-1229936 (6 Feb. 2013)
Korean Patent Publication No. 10-2008-0041915 (14 May 2008)
Japanese Patent Publication No. P2005-046615A (24 Feb. 2005)

SUMMARY OF THE INVENTION

The present inventor has created the present invention as a result of continuous efforts and attempts to develop a female-male combination type ornament having a new shape and structure that may improve work efficiency and productivity by reducing a working time taken to perform a process of assembling and attaching the female-male combination type ornament to a target object by ensuring coupling convenience and ease, and may maximize structural firmness and stability of a coupling state.

Accordingly, the present invention provides a female-male combination type ornament that may prevent a female member and a male member from rotating and moving while coupled to each other.

The present invention also provides a female-male combination type ornament that may help to improve convenience and ease in coupling a male member to a female part.

The present invention also provides a female-male combination type ornament that may further firmly maintain a coupling state between a female member and a male part.

According to an aspect of the present invention, there is provided a female-male combination type ornament including: a female member that is configured such that a plurality of insertion grooves are formed at predetermined intervals in an inner circumferential surface of a hollow of a first tubular body and a first color is integrally formed on a lower rim of the first tubular body; and a male member that is correspondingly coupled to the female member, and is configured such that a plurality of insertion projections that are inserted into the plurality of insertion grooves in a crammed manner are formed at predetermined intervals on an outer circumferential surface of a second tubular body that is inserted into the hollow of the first tubular body and a second color is integrally formed on an upper rim of the second tubular body.

Accordingly, since the plurality of insertion grooves of the female member and the plurality of insertion projections of the male member are engaged with each other, the female member and the male member may be prevented from rotating and moving due to an external force such as external impact when attached to a target object.

According to another aspect of the present invention, there is provided a female-male combination type ornament including: a female member that is configured such that a plurality of insertion grooves are formed at predetermined intervals in an inner circumferential surface of a hollow of a first tubular body and a first color is integrally formed on a lower rim of the first tubular body; and a male member that is correspondingly coupled to the female member, and is configured such that a plurality of insertion projections that are inserted into the plurality of insertion grooves in a crammed manner are formed at predetermined intervals on an outer circumferential surface of a second tubular body that is inserted into the hollow of the first tubular body and a second color is integrally formed on an upper rim of the second tubular body, wherein extended inclined surfaces are formed on both rims of upper end portions of the plurality of insertion grooves to have widths that increase upward, and reduced inclined surfaces are formed on both edges of lower end portions of the plurality of insertion projections to have widths that decrease downward.

Accordingly, since contact interference due to a thickness of a plating layer does not occur due to the extended inclined surfaces and the reduced inclined surfaces even when electroplating is performed on the surfaces, the female member and the male member may be more simply, easily, and smoothly coupled to each other, a working time taken to couple the female member to the male member may be reduced, and work efficiency and productivity may be improved.

The plurality of insertion grooves may be formed to have widths that increase away from a center of the first tubular body, and the plurality of insertion projections that correspond to the plurality of insertion grooves may be formed to have widths that increase away from a center of the second tubular body, 8 insertion grooves and 8 insertion projections may be formed to be arranged in odd-numbered or even-numbered angle areas among 16 angle areas that are separated at equal angles about centers of the first tubular body and the second tubular body.

In order to prevent the male member from being axially separated and detached from the female member that is coupled to the male member, anti-detachment grooves may be formed in inner surfaces of the plurality of insertion grooves and anti-detachment projections having wedge shapes that are inserted into the anti-detachment grooves may be correspondingly formed on outer surfaces of the plurality of insertion projections that face the plurality of insertion grooves.

Accordingly, since a coupling state between the female member and the male member may be more firmly and stably maintained, the female member and the male member may be prevented from being easily separated and detached from a target object.

A seating portion that covers a bottom surface of a lower end portion of the second tubular body may integrally protrude from an inner circumferential surface of a lower end portion of the hollow of the first tubular body, wherein, in order to prevent the male member from being axially detached from the female member that is coupled to the male member, a plurality of fixing projections are formed at predetermined intervals on the seating portion and fixing grooves into which the fixing projections are inserted are formed in the bottom surface of the lower end portion of the second tubular body that faces the first tubular body.

Accordingly, since a coupling state between the female member and the male member may be more firmly and stably maintained, the female member and the male member may be prevented from being easily separated and detached from a target object.

According to another aspect of the present invention, there is provided a female-male combination type ornament including: a female member that is configured such that first coupling bodies integrally protrude from both sides of a top surface of a first planar body and a plurality of insertion grooves are formed at predetermined intervals in the first coupling bodies; and a male member that is correspondingly coupled to the female member, and is configured such that second coupling bodies integrally protrude from both sides of a bottom surface of a second planar body and a plurality of insertion projections that are inserted into the plurality of insertion grooves in a crammed manner, wherein extended inclined surfaces are formed on rims of upper end portions of the plurality of insertion grooves to have widths that increase upward, and reduced inclined surfaces are formed on edges of lower end portions of the plurality of insertion projections to have widths that decrease downward.

Accordingly, since contact interference due to a thickness of a plating layer does not occur due to the extended inclined surfaces and the reduced inclined surfaces even when surfaces are plated, the female member and the male member may be more simply, easily, and smoothly coupled to each other, a working time taken to couple the female member to the male member may be reduced, and work efficiency and productivity may be improved.

The plurality of insertion grooves may be formed to have widths that increase away from a center of the first planar body, and the plurality of insertion projections that correspond to the plurality of insertion grooves may be formed to have widths that increase away from a center of the second planar body, wherein a plurality of spikes that are hammered into a target object integrally protrude from rims of the first and second planar bodies.

In order to prevent the male member from being separated and detached from the female member that is coupled to the male member in opposite directions, anti-detachment grooves may be formed in inner side walls of the plurality of insertion grooves and anti-detachment projections having wedge shapes that are inserted into the anti-detachment grooves may be correspondingly formed on outer surfaces of the plurality of insertion projections that face the plurality of insertion grooves.

Accordingly, since a coupling state between the female member and the male member may be more firmly and stably maintained, the female member and the male member may be prevented from being easily separated and detached from a target object.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
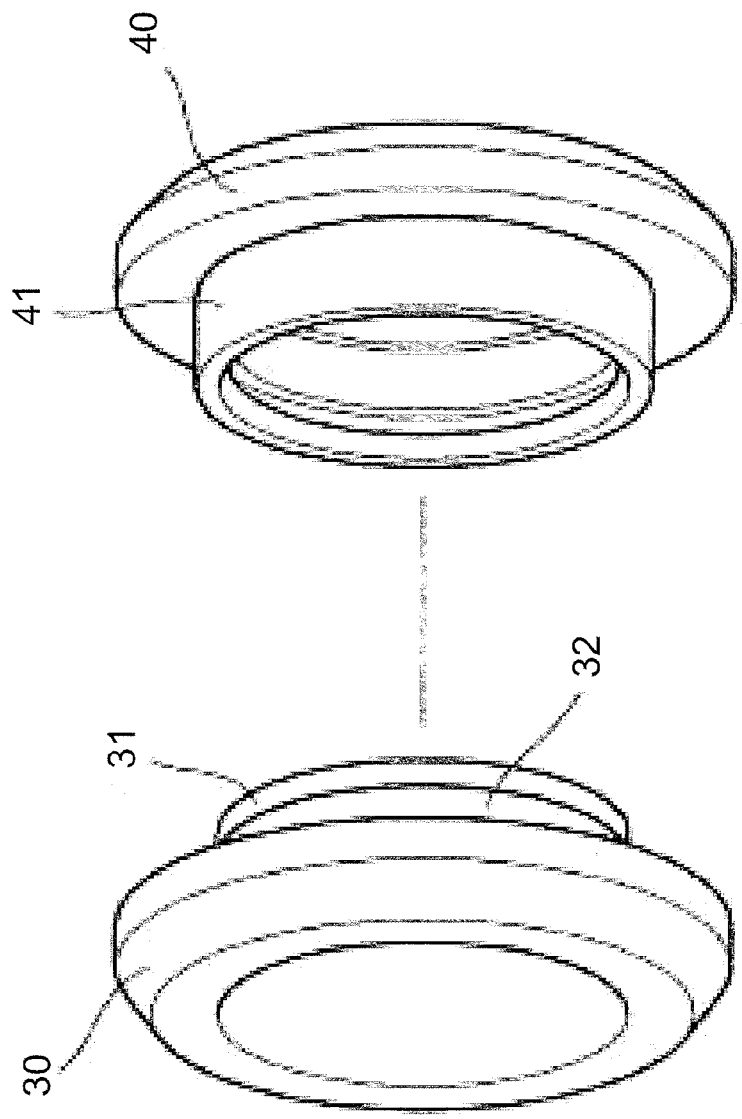
FIG. 1 is a perspective view illustrating a conventional female-male combination type ornament.

Various exemplary embodiments will now be described more fully with reference to the accompanying drawings in which some exemplary embodiments are shown.

It will be further understood that terms, such as those defined in commonly used dictionaries, should be interpreted as having a meaning that is consistent with their meaning in the context of the relevant art In the following description of the present invention, a detailed description of known functions and configurations incorporated herein will be omitted when it may make the subject matter of the present invention unclear.

In the drawings, sizes of elements may be exaggerated for clarity and convenience of explanation of configurations and operations, and may differ from actual sizes.

<First Embodiment>

Figure 2:
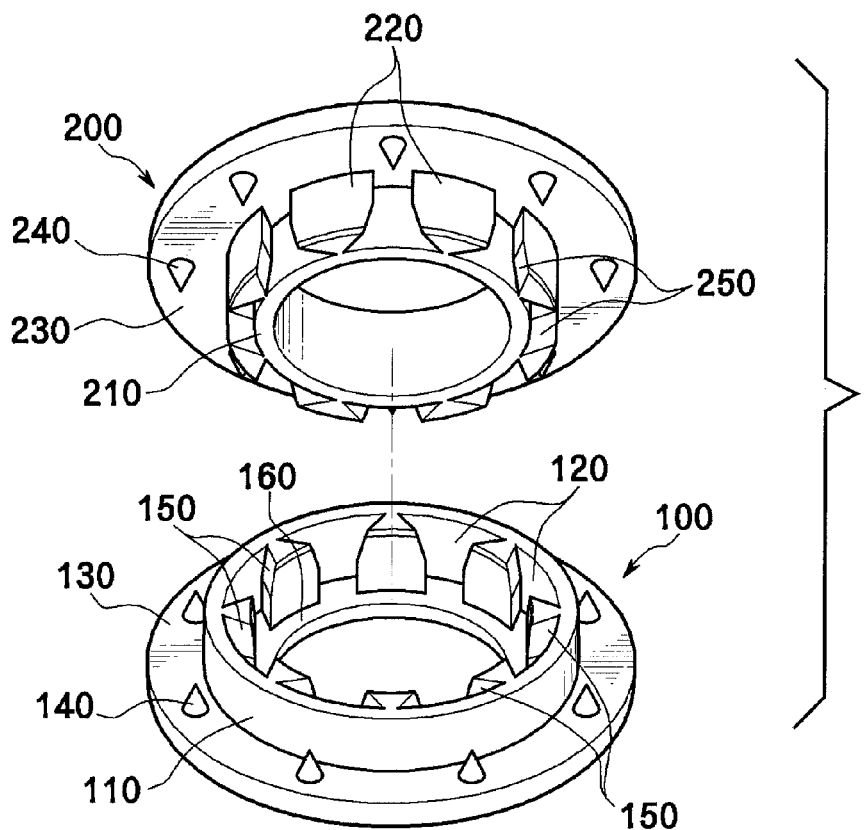
FIG. 2 is a perspective view illustrating a state before a female-male combination type ornament according to a first embodiment of the present invention is coupled.
Figure 3:
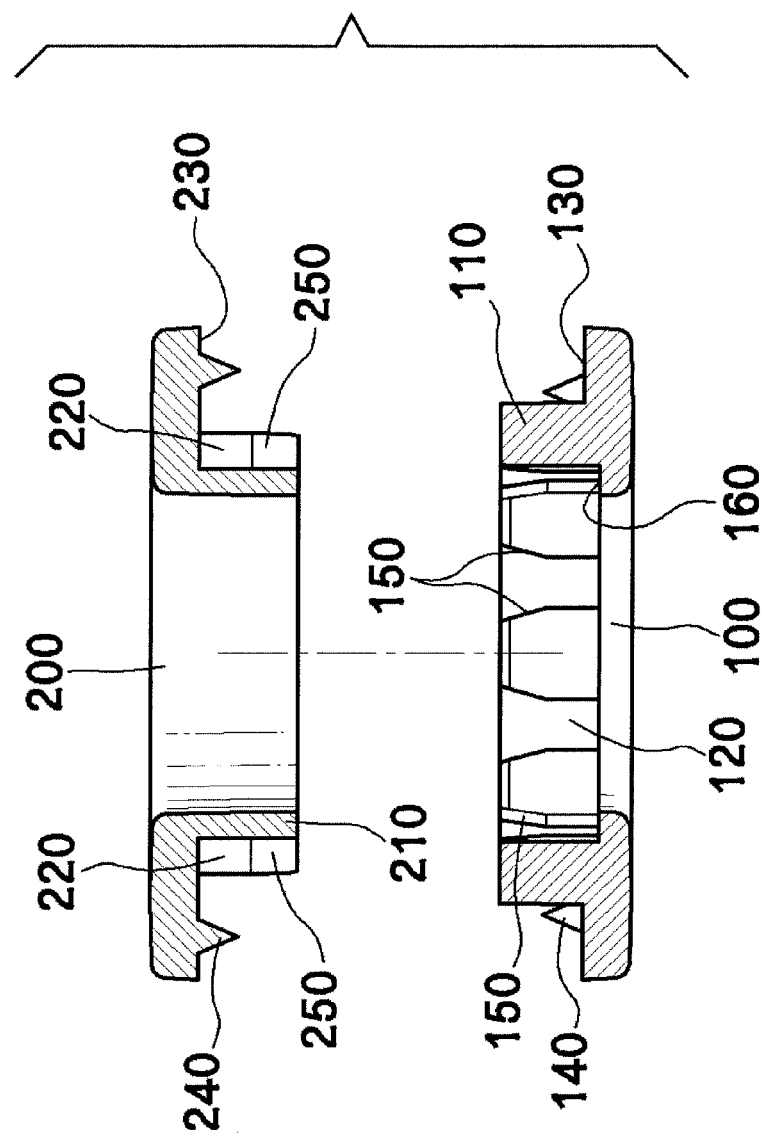
FIG. 3 is a side-sectional view illustrating a state before the female-male combination type ornament of the first embodiment of the present invention is coupled.

Referring to FIGS. 2 and 3, a female-male combination type ornament according to a first embodiment of the present invention roughly includes a female member 100 and a male member 200 that is correspondingly coupled to the female member 100.

The female member 100 includes a first tubular body 110 that has a predetermined inner diameter and a predetermined length and has a tubular shape, a plurality of insertion grooves 120 that are formed at predetermined intervals in an inner circumferential surface of a hollow of the first tubular body 110, and a first color 130 that is integrally formed on a lower rim of the first tubular body 110 to come in surface contact with a target object.

Extended inclined surfaces 150 are formed on both rims of upper end portions of the insertion grooves 120 to have widths that increase upward, that is, toward insertion projections 220 that face the insertion grooves 120 when the male member 200 is coupled to the female member 100.

The male member 200 includes a second tubular body 210 that has a predetermined outer diameter and a predetermined length to be inserted into the hollow of the first tubular body 110 and has a tubular shape, the plurality of insertion projections 220 that are formed at predetermined intervals on an outer circumferential surface of the second tubular body 210 to be inserted into the insertion grooves 120 of the female member 100 in a crammed manner, and a second color 230 that is integrally formed on an upper rim of the second tubular body 210 to come in surface contact with the target object at the opposite side to the first color 130 of the female member 100.

Reduced inclined surfaces 250 are formed on both edges of lower end portions of the insertion projections 220 to have widths that decrease downward, that is, toward that insertion grooves 120 that face the insertion projections 220 when the male member 200 is coupled to the female member 100.

Accordingly, even when a plating layer is unevenly and excessively formed in a process of processing surfaces of the female member 100 and the male member 200 using electroplating, the plating layer may not be formed to have a thickness great enough to cause contact interference due to the extended inclined surfaces 150 and the reduced inclined surfaces 250. In addition, since the extended inclined surfaces 150 and the reduced inclined surfaces 250 guide coupling positions when the female member 100 and the male member 200 are coupled to each other, even when the female member 100 and the male member 200 are not accurately located on the same central axis, the female member 100 and the male member 200 may be more simply, easily, and smoothly coupled to each other.

Also, since the insertion grooves 120 and the insertion projections 220 are engaged with each other like in meshing of gears, the female member 100 and the male member 200 may be prevented from rotating or moving while coupled to each other.

The extended inclined surfaces 150 of the female member 100 and the reduced inclined surfaces 250 of the male member 200 may be formed to be inclined at an angle of about 60±5° when seen from a virtual horizontal line.

Also, in order to increase a contact area and a frictional force between the insertion grooves 120 of the female member 100 and the insertion projections 220 of the male member 200 that are engaged with each other, the insertion grooves 120 may be formed to have widths that increase away from a center of the first tubular body 110, and the insertion projections 220 that correspond to the insertion grooves 120 may be formed to have widths that increase away from a center of the second tubular body 210.

In addition, a plurality of spikes 140 and 240 having sharp ends that are hammered into the target object when the female member 100 and the male member 200 are coupled to each other may integrally protrude from facing surfaces of the first color 130 and the second color 230 at alternate positions in order to prevent the female member 100 and the male member 200 from moving or being separated from the target object due to a tensile force.

A seating portion 160 that covers a bottom surface of a lower end portion of the second tubular body 210 when the female member 100 and the male member 200 are coupled to each other and enables the hollow of the first tubular body 110 and the hollow of the second tubular body 210 to be aligned protrudes from an inner circumferential surface of a lower end portion of the hollow of the first tubular body 110 toward the center of the first tubular body 110.

Although it is preferable that the first tubular body 110 and the second tubular body 210 be formed to have circular shapes being seen from a planar view, the present embodiment is not limited thereto, and the first tubular body 110 and the second tubular body 210 may be formed to have any of various shapes such as triangular shapes, quadrangular shapes, polygonal shapes, or diamond shapes.

Although the plurality of insertion grooves 120 may be formed at predetermined intervals in the inner circumferential surface of the hollow of the first tubular body 110 and the plurality of insertion projections 220 that are correspondingly coupled to the plurality of insertion grooves 120 may be formed at predetermined intervals on the outer circumferential surface of the second tubular body 210, the present embodiment is not limited thereto, and a plurality of insertion projections may be formed at predetermined intervals on the inner circumferential surface of the hollow of the first tubular body 110 and a plurality of insertion grooves may be formed at predetermined intervals in the outer circumferential surface of the second tubular body 210.

Also, although the first color 130 and the second color 230 may be formed to have circular shapes when seen from a planar view, the present embodiment is not limited thereto, and the first color 130 and the second color 230 may be formed to have any of various shapes according to design and use such as triangular shapes, quadrangular shapes, or diamond shapes.

In order to ensure speed, ease, and convenience in coupling the male member 200 to the female member 100, it is most preferable that 8 insertion grooves 120 and 8 insertion projections 220 be arranged in odd-numbered or even-numbered angle areas among 16 angle areas that are separated at equal angles about the centers of the first tubular body 110 and the second tubular body 210.

That is, since the insertion grooves 120 and the insertion projections 220 are arranged radially in 8 directions about the centers of the first tubular body 110 and the second tubular body 210, the insertion grooves 120 and the insertion projections 220 are engaged with each other when the female member 100 and the male member 200 are coupled to each other. Assuming that the insertion grooves 120 and the insertion projections 220 are not engaged with each other, when the female member 100 and the male member 200 are slightly rotated in opposite directions, the insertion grooves 120 and the insertion projections 220 may be naturally engaged with each other, thereby enabling an adjustment operation for stable coupling to be rapidly and easily performed.

For example, assuming that the first color 130 and the second color 230 are formed to have quadrangular shapes, since the insertion grooves 120 and the insertion projections 220 are arranged to be vertically and horizontally symmetric in 8 directions about the centers, when the female member 100 and the male member 200 are slightly rotated in opposite directions, the first color 130 and the second color 230 may be easily adjusted to be located at corresponding positions.

<Second Embodiment>

Figure 4:
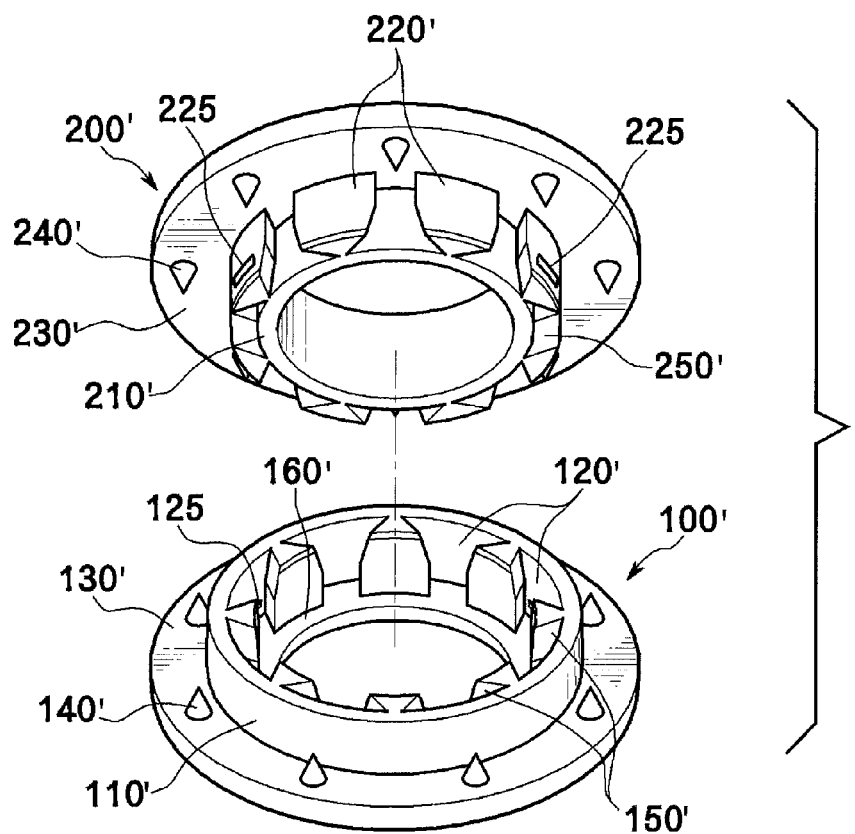
FIG. 4 is a perspective view illustrating a state before a female-male combination type ornament according to a second embodiment of the present invention is coupled.
Figure 5:
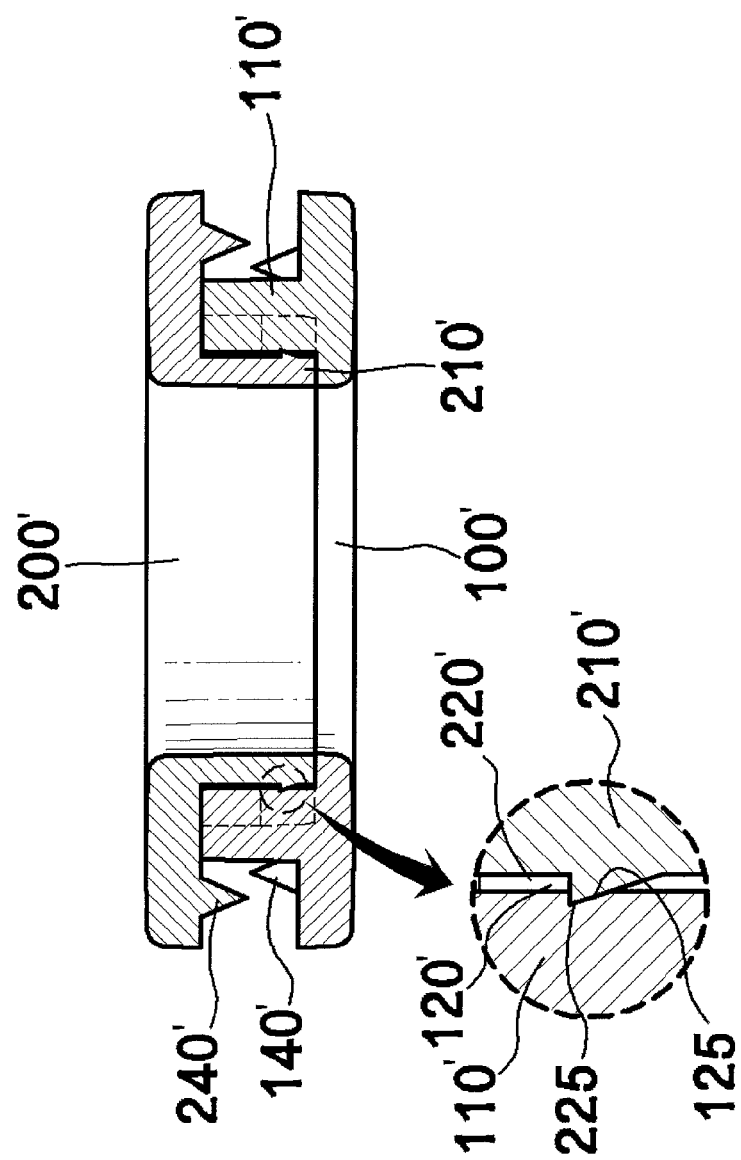
FIG. 5 is a side-sectional view illustrating a state in which the female-male combination type ornament of the second embodiment of the present invention is coupled.

Referring to FIGS. 4 and 5 illustrating a female-male combination type ornament according to a second embodiment of the present invention, in order to prevent the male member 200' from being axially separated and detached from the female member 100' that is coupled to the male member 200', anti-detachment grooves 125 are formed in inner side walls of the insertion grooves 120' and anti-detachment projections 225 having wedge shapes that are inserted into the anti-detachment grooves 125 when the insertion projections 220 of the male member 200' are completely inserted into the insertion grooves 120' of the female member 100' are correspondingly formed on outer surfaces of the insertion projections 220' that face the insertion grooves 120'.

That is, assuming that the female member 100' and the male member 200' are to be coupled to each other, since the insertion projections 220' are inserted into the insertion grooves 120' and the anti-detachment projections 225 are simultaneously inserted into the anti-detachment grooves 125, a coupling force may be further reinforced and increased, and thus a coupling state between the female member 100' and the male member 200' may be more firmly and stably maintained.

Although it is preferable that the anti-detachment grooves 125 be formed in the inner side walls of the insertion grooves 120' and the anti-detachment projections 225 that are correspondingly coupled to the anti-detachment grooves 125 be formed on the outer surfaces of the insertion projections 220', the present embodiment is not limited thereto, and anti-detachment projections may be formed on the inner side walls of the insertion grooves 120' and anti-detachment grooves may be formed in the outer surfaces of the insertion projections 220'.

In the second embodiment of the present invention, elements having the same or similar operations and effects as or to those in the first embodiment of the present invention are denoted by the same reference numerals with the addition of a prime indicator ("'"), and a repeated and explanation thereof will not be given.

<Third Embodiment>

Figure 6:
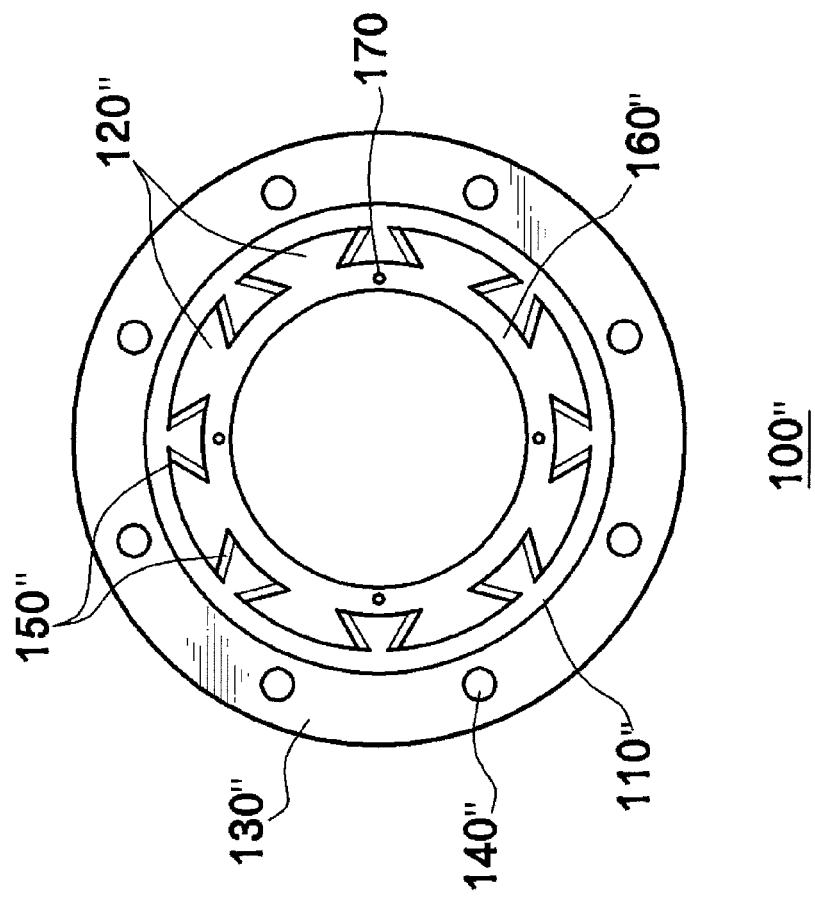
FIG. 6 is a plan view illustrating a female member of a female-male combination type ornament according to a third embodiment of the present invention.
Figure 7:
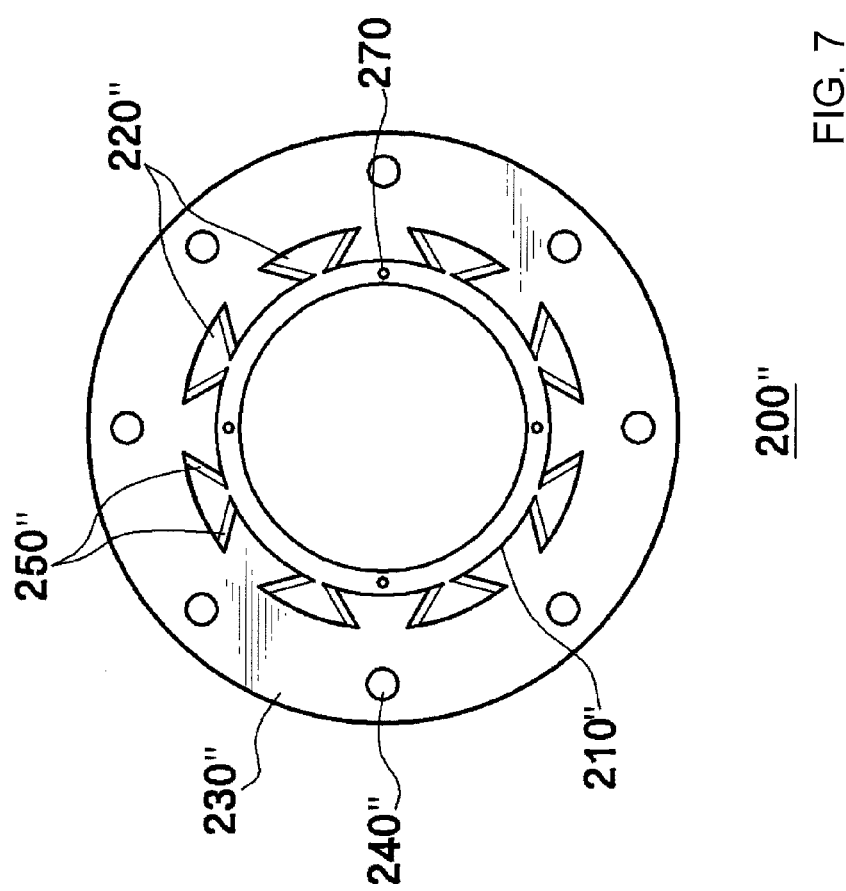
FIG. 7 is a bottom view illustrating a male member of the female-male combination type ornament according to the third embodiment of the present invention.
Figure 8:
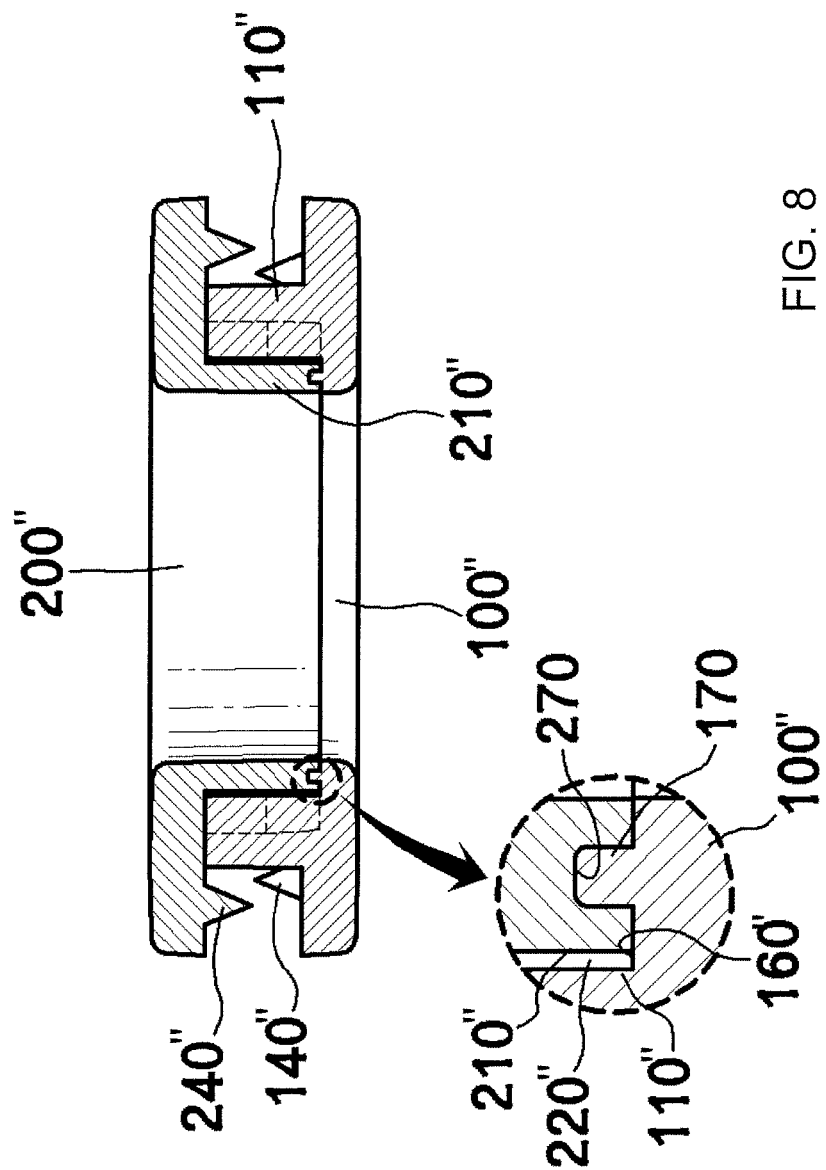
FIG. 8 is a side-sectional view illustrating a state in which the female-male combination type ornament according to the third embodiment of the present invention is coupled.
Figure 9:
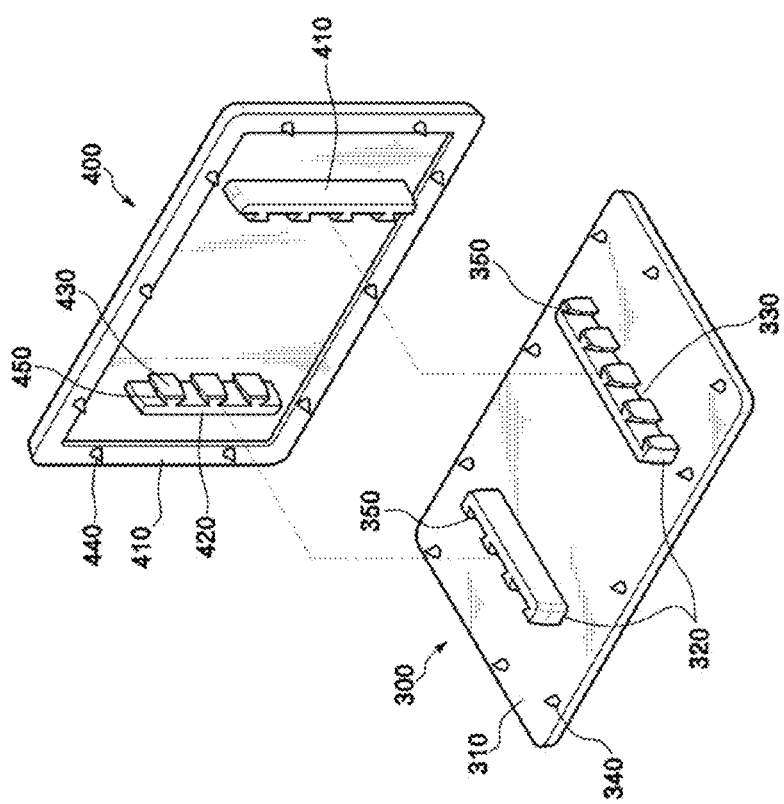
FIG. 9 is a view illustrating a state before a female-male combination type ornament according to a fourth embodiment of the present invention is coupled.
Figure 10:
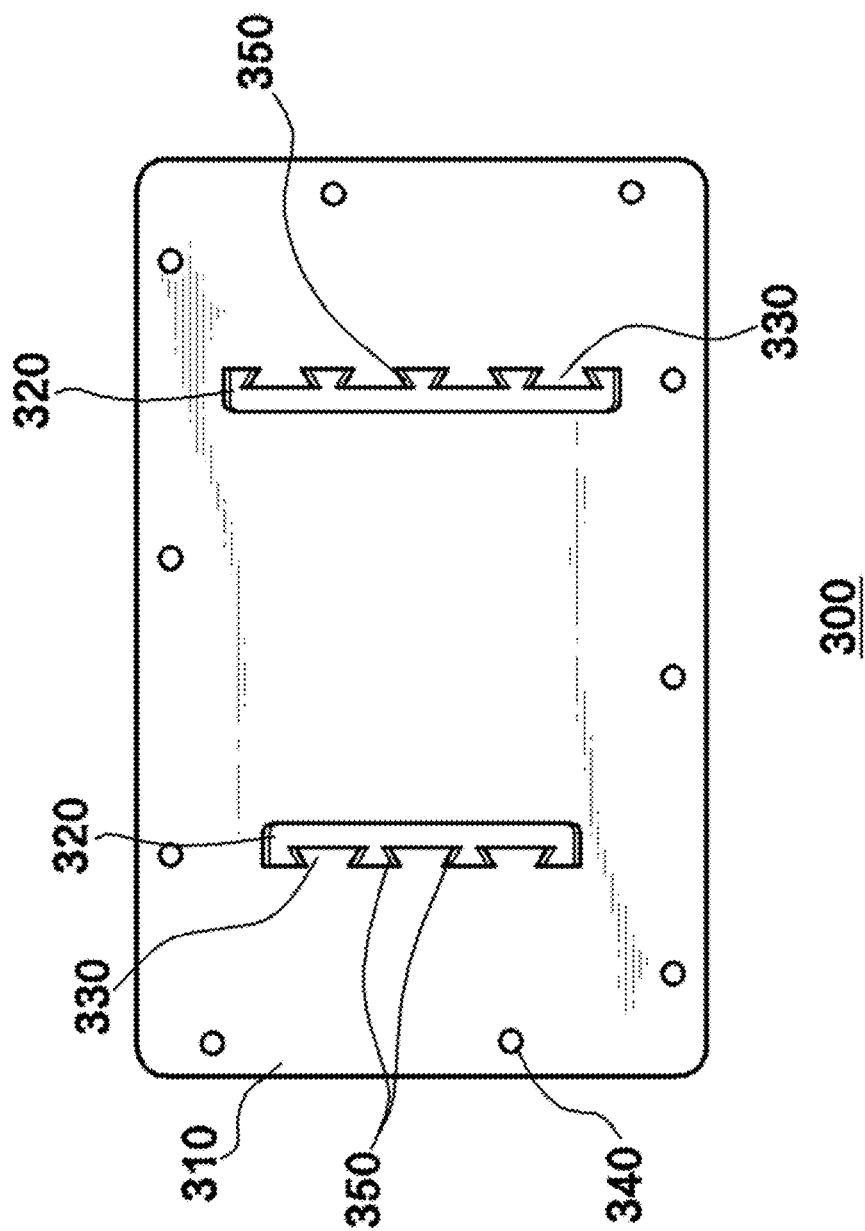
FIG. 10 is a plan view illustrating a female member of the female-male combination type ornament according to the fourth embodiment of the present invention.
Figure 11:
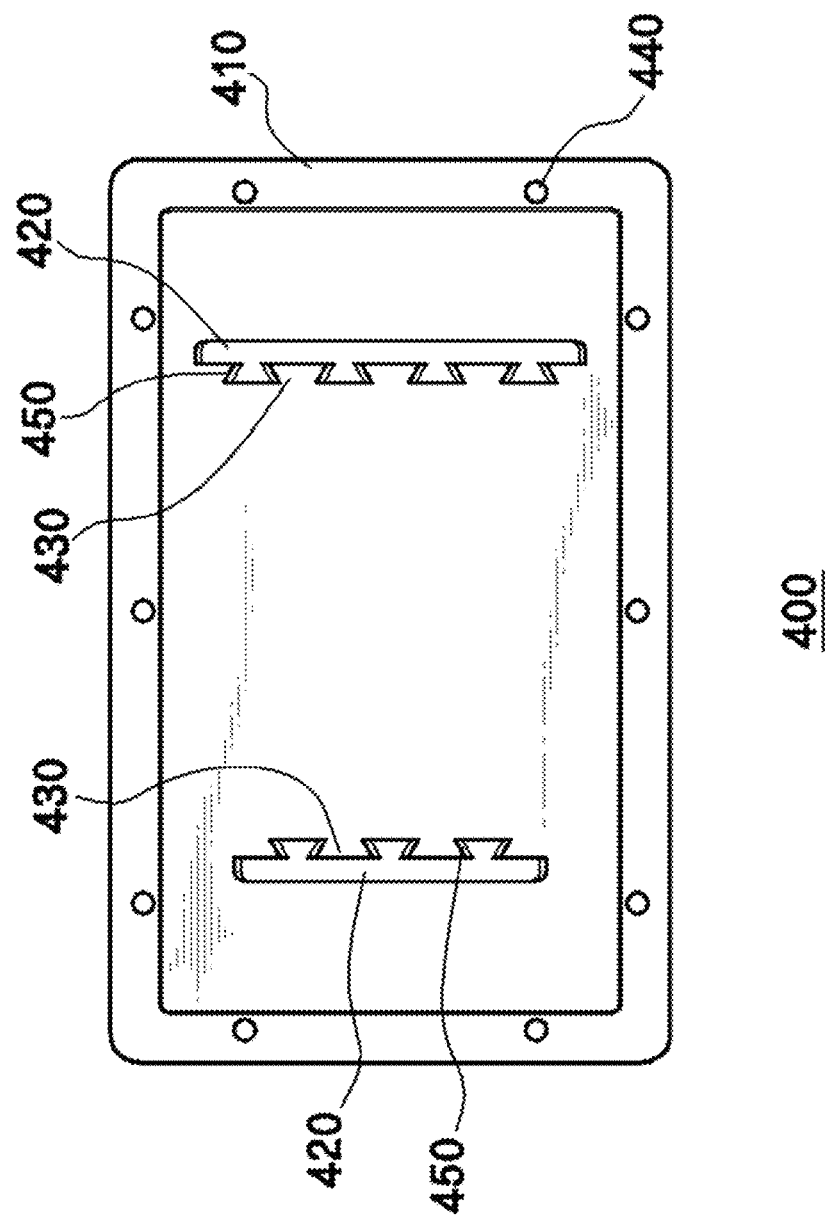
FIG. 11 is a bottom view illustrating a male member of the female-male combination type ornament according to the fourth embodiment of the present invention.
Figure 12:
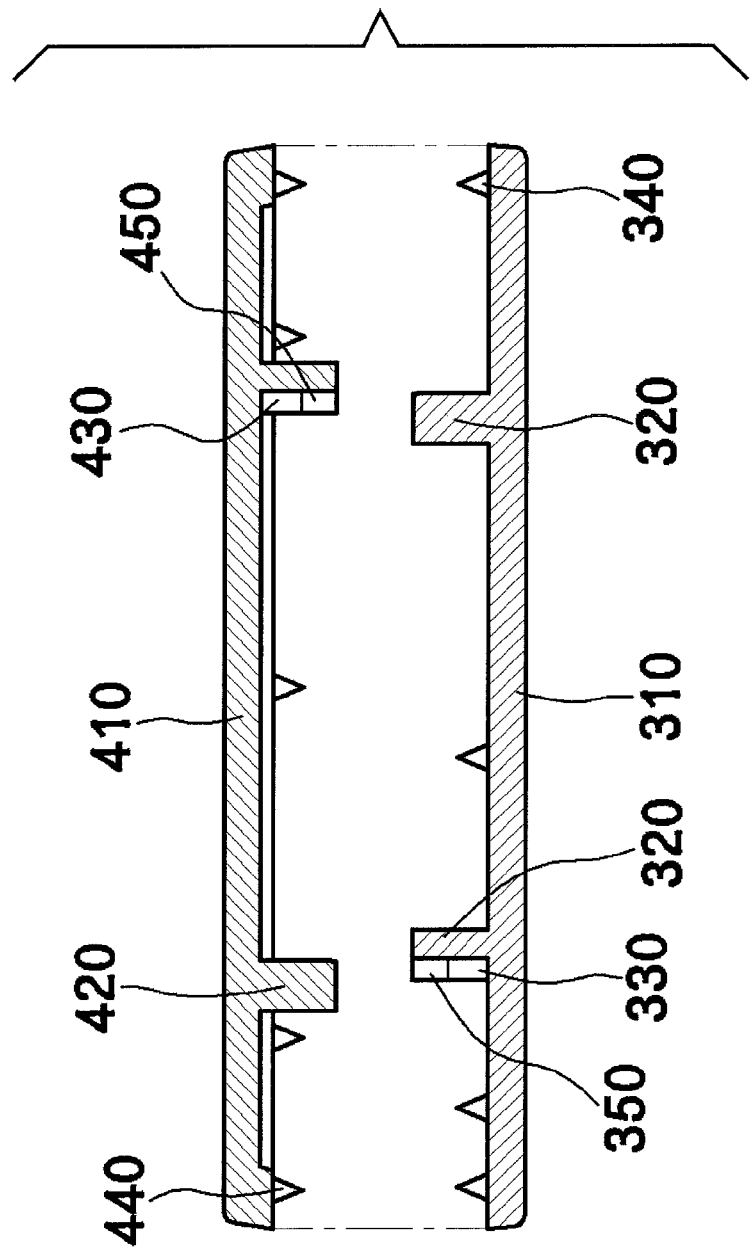
FIG. 12 is a side-sectional view illustrating a state before the female-male combination type ornament according to the fourth embodiment of the present invention is coupled.

Referring to FIGS. 6 through 8 illustrating a female-male combination type ornament according to a third embodiment of the present invention, in order to prevent the male member 200" from being axially separated and detached from the female member 100" that is coupled to the male member 200", a plurality of fixing projections 170 are formed at predetermined intervals on the seating portion 160" of the female member 100" and fixing grooves 270 into which the fixing projections 170 are inserted in a crammed manner are formed in a bottom surface of a lower end portion of the second tubular body 210" that faces the first tubular body 110".

That is, assuming that the female member 100" and the male member 200" are to be coupled to each other, since the insertion projections 220" are inserted into the insertion grooves 120" and the fixing projections 170 are simultaneously inserted into the fixing grooves 270, a coupling state may be more firmly and stably maintained.

When a structure of the fixing projections 170 and the fixing grooves 270 of the third embodiment of the present invention and a structure of the anti-detachment grooves 125 and the anti-detachment projections 225 of the second embodiment of the present invention are integrally formed, a double coupling structure may be obtained, thereby maximizing a coupling force between the female member 100" and the male member 200".

In the third embodiment of the present invention, elements having the same or similar operations and effects as or to those in the first and second embodiments of the present invention are denoted by the same reference numerals with the addition of a double prime indicator ("""), and a repeated and detailed explanation thereof will not be given.

<Fourth Embodiment>

Referring to FIGS. 9 through 12, a female-male combination type ornament according to a fourth embodiment of the present invention roughly includes a female member 300 and a male member 400 that is correspondingly coupled to the female member 300.

The female member 300 includes a first planar body 310 that has a substantially quadrangular shape having a predetermined width, area, and thickness to come in surface contact with a target object, first coupling bodies 320 that integrally protrude from both sides of a top surface of the first planar body 310, and a plurality of insertion grooves 330 that are formed at predetermined intervals in the first coupling bodies 320.

Extended inclined surfaces 350 having widths that increase upward, that is, toward a second planar body 410 that faces the first planar body 310 when the male member 400 is coupled to the female member 300, are formed on both rims of upper end portions of the insertion grooves 330.

The male member 400 includes the second planar body 410 that has a substantially quadrangular shape having a predetermined width, area, and thickness, second coupling bodies 420 that integrally protrude from both sides of a bottom surface of the second planar body 410, and a plurality of insertion projections 430 that are formed at predetermined intervals on the second coupling bodies 420 and are inserted into the insertion grooves 330 in a crammed manner.

Reduced inclined surfaces 450 having widths that decrease downward, that is, toward the first coupling bodies 320 that face the second coupling bodies 420 when the female member 300 is coupled to the male member 400, are formed on both edges of lower end portions of the insertion projections 430.

Accordingly, even when surfaces of the female member 300 and the male member 400 are subjected to electroplating, a plating layer is not formed to have a thickness great enough to cause contact interference due to the extended inclined surfaces 350 and the reduced inclined surfaces 450. In addition, since the extended inclined surfaces 350 and the reduced inclined surfaces 450 guide coupling positions when the female member 300 and the male member 400 are coupled to each other, the female member 300 and the male member 400 may be more simply, easily, and smoothly coupled to each other even when the female member 300 and the male member 400 are not accurately located on the same central axis.

The extended inclined surfaces 350 of the female member 300 and the reduced inclined surfaces 450 of the male member 400 may be inclined at an angle of about 60° when being seen from a virtual horizontal line.

Also, in order to increase a contact area and a frictional force between the insertion grooves 330 of the female member 300 and the insertion projections 430 of the male member 400, the insertion grooves 330 may be formed to have widths that increase away from a center of the first planar body 310 and the insertion projections 430 that correspond to the insertion grooves 330 are formed to have widths that increase away from a center of the second planar body 410.

In addition, a plurality of spikes 340 and 440 that are hammered into the target object when the female member 300 and the male member 400 are coupled to each other may integrally protrude from facing rims of the first planar body 310 and the second planar body 410 in order to prevent the female member 300 and the male member 400 from moving or being separated from the target object.

Although it is preferable that the first planar body 310 and the second planar body 410 be formed to have quadrangular shapes when seen from a planar view, the present embodiment is not limited thereto, and the first planar body 310 and the second planar body 410 may be formed to have any of various shapes such as circular shapes, triangular shapes, polygonal shapes, or diamond shapes.

Also, although the first coupling bodies 320 and the second coupling bodies 420 are formed to have "-" shapes, the present embodiment is not limited thereto, and if necessary, the first coupling bodies 320 and the second coupling bodies 420 may be formed to have any of various shapes such as "⌐" or "∟" shapes.

<Fifth Embodiment>

Figure 13:
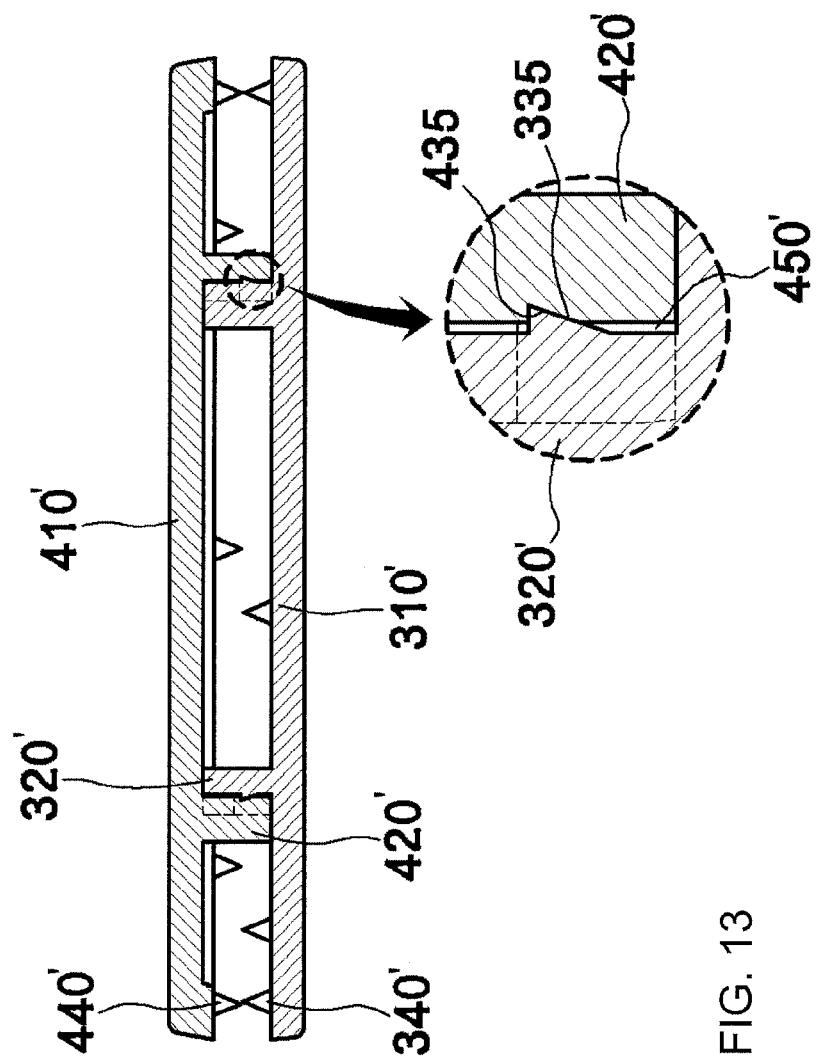
FIG. 13 is a side-sectional view illustrating a state in which a female-male combination type ornament according to a fifth embodiment of the present invention is coupled.

Referring to FIG. 13 illustrating a female-male combination type ornament according to a fifth embodiment of the present invention, in order to prevent the male member 400' from being separated and detached from the female member 300' that is coupled to the male member 400' in opposite directions, anti-detachment grooves 335 are formed in inner side walls of the insertion grooves 330' and anti-detachment projections 435 having wedge shapes that are inserted into the anti-detachment grooves 335 when the insertion projections 430' of the male member 400' are completely inserted into the insertion grooves 330' of the female member 300' are formed on outer surfaces of the insertion projections 430' to correspond to the anti-detachment grooves 335.

That is, assuming that the female member 300' and the male member 400' are to be coupled to each other, since the insertion projections 430' are inserted into the insertion grooves 330' and the anti-detachment projections 435 are simultaneously inserted into the anti-detachment grooves 335, a coupling state may be more firmly and stably maintained.

Although it is preferable that the anti-detachment grooves 335 be formed in the inner side walls of the insertion grooves 330' and the anti-detachment projections 435 that are correspondingly coupled to the insertion grooves 330' be formed on the outer surfaces of the insertion projections 430', the present embodiment is not limited thereto, and anti-detachment projections may be formed on the inner side walls of the insertion grooves 330 and anti-detachment grooves may be formed in the outer surfaces of the insertion projections 430'.

In the fifth embodiment of the present invention, elements having the same or similar operations and effects as or to those in the fourth embodiment of the present invention are denoted by the same reference numerals with the addition of a prime indicator ("'"), and a repeated and detailed explanation thereof will not be given.

A method of manufacturing the female-male combination type ornament according to the first embodiment of the present invention may be performed as follows.

<First Process> Manufacturing of Mold

A first process is a process of manufacturing a die casting mold. In the first process, the die casting mold including an upper part and a lower part is manufactured. In this case, as shown in FIG. 2, the die casting mold is manufactured to include a cavity for the female member 100 that is configured such that the plurality of insertion grooves 120 are formed at predetermined intervals in an inner circumferential surface of a hollow of the first tubular body 110, the first color 130 is integrally formed on a lower rim of the first tubular body 110, and the extended inclined surfaces 150 are formed on both rims of upper end portions of the insertion grooves 120 to have widths that increase upward, and a cavity for the male member 200 that is configured such that the plurality of insertion projections 220 that are inserted into the insertion grooves 120 in a crammed manner are formed at predetermined intervals on an outer circumferential surface of the second tubular body 210 that is inserted into the hollow of the first tubular body 110, the second color 230 is integrally formed on an upper rim of the second tubular body 210, and the reduced inclined surfaces 250 that are formed on both edges of lower end portions of the insertion projections 220 to have widths that decrease downward.

As shown in FIG. 4, in the cavity for the female member 100, the anti-detachment grooves 125 may be additionally formed in inner side walls of the insertion grooves 120, and in the cavity for the male member 200 that corresponds to the cavity for the female member 100, the anti-detachment projections 225 that are inserted into the anti-detachment grooves 125 may be additionally formed on outer surfaces of the insertion projections 220.

<Second Process> Melting of Zinc Alloy

A second process is a process of melting a zinc alloy. In the second process, the zinc alloy to be injected into the cavity of the die casting mold is put into a furnace and is heated and melted at a high temperature. A melting temperature may range from about 400° C. to about 420° C. When the melting temperature is equal to or lower than 400° C., the zinc alloy may not be well melted, and when the melting temperature is equal to or higher than 420° C., physical properties of the zinc alloy may be changed.

Although the zinc alloy may include about 90% zinc and about 1 to 10% aluminum, magnesium, copper, tin, and antimony in order to be precisely injected into the cavity of the die casting mold, the present embodiment is not limited thereto. If necessary, an aluminum alloy including copper, magnesium, and silicon may be used.

<Third Process> Injection Molding

A third process is a process of injecting the molten zinc alloy into the cavity of the die casting mold. In the third process, injection molding is performed by injecting a predetermined amount of the molten zinc alloy into the cavity of the die casting mold through a sprue of the die casting mold and pressing the molten zinc alloy using an injection plunger having a high pressure. In this case, the molten zinc alloy in the die casting mold is solidified in a state in which the high pressure of the injection plunger is maintained, and the upper part and the lower part of the die casting mold are separated from each other to take out the formed female member and male member.

<Fourth Process> Polishing and Glossing

A fourth process is a process of removing, trimming, and polishing burrs of the formed female member and male member. In the fourth process, the female member and the male member that are integrally formed are separated from each other, and then surfaces of the female member and the male member are trimmed by removing the burrs, are polished by being rubbed with sandpaper, and are glossed. In this case, rough grinding is performed by adjusting grit sizes of the sandpaper and then finishing is performed.

The burrs or rough surfaces of the female member and the male member may be polished using barrel polishing.

That is, when the formed female member and male member are loaded into a barrel along with polishing particles (e.g., steel balls or sand) and are rotated, the burrs or sharp portions on the surfaces of the female member and the male member are naturally cut, abraded, and smoothed due to friction and impact with the polishing particles.

Also, the surfaces of the female member and the male member may be glossed by being rubbed with a soft cloth to which a glossing/polishing agent such as silica sand is applied.

<Fifth Process> Plating

A fifth process is a process of plating the surfaces of the female member and the male member. In order to create a luxury image and a precious metal image, provide a gloss effect, and improve corrosion resistance, surface treatment that is a process of forming a thin film formed of gold, silver, or nickel is performed on the surfaces of the female member and the male member using electroplating. In this case, a plating layer formed of gold or silver may be formed to a thickness of 0.3 μm, and a plating layer formed of nickel may be formed to a thickness of 0.25 μm.

According to the one or more embodiments of the present invention, since insertion grooves of a female member and insertion projections of a male member are engaged with each other like in meshing of gears, the female member and the male member may be prevented from rotating or moving while coupled to each other.

Also, since contact interference due to a plating layer having a great thickness does not occur due to extended inclined surfaces and reduced inclined surfaces even when the plating layer is unevenly and excessively formed in a process of performing surface treatment using electroplating during a finishing process of a product, the female member and the male member may be more simply, easily, and smoothly coupled to each other.

In addition, since the extended inclined surfaces and the reduced inclined surfaces naturally guide coupling positions of the female member and the male member, even when the female member and the male member are not accurately located on the same central axis, the female member and the male member may be conveniently coupled to each other, a working time may be reduced, and work efficiency and productivity may be improved.

Also, since a coupling state between the female member and the male member may be more firmly and stably maintained due to a secondary coupling force that is generated due to a coupling relationship between anti-detachment grooves and anti-detachment projections and between fixing grooves and fixing projections, the female member and the male member may be effectively prevented from being easily separated and detached from a target object to which the female member and the male member are fixed even when an external force is applied.

While the inventive concept has been particularly shown and described with reference to exemplary embodiments thereof, they are provided for the purpose of illustration and it will be understood by those of ordinary skill in the art that various modifications and other equivalent embodiments can be made from the inventive concept.

Therefore, the scope of the invention is defined not by the detailed description of the invention but by the appended claims, and all differences within the scope will be construed as being included in the present invention.

What is claimed is:

1. A female-male combination type ornament comprising:
a female member that is configured such that a plurality of insertion grooves are formed at predetermined intervals in an inner circumferential surface of a hollow of a first tubular body and a first collar is integrally formed on the first tubular body; and
a male member that is correspondingly coupled to the female member, and is configured such that a plurality of insertion projections that are inserted into the plurality of insertion grooves in a crammed manner are formed at predetermined intervals on an outer circumferential surface of a second tubular body that is inserted into the hollow of the first tubular body and a second collar is integrally formed on the second tubular body,
wherein the plurality of insertion grooves are formed to have widths that increase away from a center of the first tubular body, and the plurality of insertion projections that correspond to the plurality of insertion grooves are formed to have widths that increase away from a center of the second tubular body,
wherein a plurality of spikes that are hammered into a target object integrally protrude from facing surfaces of the first and second collars.

2. The female-male combination type ornament of claim 1, wherein extended inclined surfaces are formed on both rims of upper end portions of the plurality of insertion grooves to have widths that increase upward, and reduced inclined surfaces are formed on both edges of lower end portions of the plurality of insertion projections to have widths that decrease downward.

3. A female-male combination type ornament comprising:
a female member that is configured such that a plurality of insertion grooves are formed at predetermined intervals in an inner circumferential surface of a hollow of a first tubular body and a first collar is integrally formed on the first tubular body; and
a male member that is correspondingly coupled to the female member, and is configured such that a plurality of insertion projections that are inserted into the plurality of insertion grooves in a crammed manner are formed at predetermined intervals on an outer circumferential surface of a second tubular body that is inserted into the hollow of the first tubular body and a second collar is integrally formed on the second tubular body,
wherein, in order to prevent the male member from being axially separated and detached from the female member that is coupled to the male member, anti-detachment grooves are formed in inner surfaces of the plurality of insertion grooves and anti-detachment projections having wedge shapes that are inserted into the anti-detachment grooves are correspondingly formed on outer surfaces of the plurality of insertion projections that face the plurality of insertion grooves.

4. A female-male combination type ornament comprising:
a female member that is configured such that a plurality of insertion grooves are formed at predetermined intervals in an inner circumferential surface of a hollow of a first tubular body and a first collar is integrally formed on the first tubular body; and
a male member that is correspondingly coupled to the female member, and is configured such that a plurality of insertion projections that are inserted into the plurality of insertion grooves in a crammed manner are formed at predetermined intervals on an outer circumferential surface of a second tubular body that is inserted into the hollow of the first tubular body and a second collar is integrally formed on the second tubular body,
wherein 8 insertion grooves and 8 insertion projections are formed to be arranged in odd-numbered or even-numbered angle areas among 16 angle areas that are separated at equal angles about centers of the first tubular body and the second tubular body.

5. A female-male combination type ornament comprising:
a female member that is configured such that a plurality of insertion grooves are formed at predetermined intervals in an inner circumferential surface of a hollow of a first tubular body and a first collar is integrally formed on the first tubular body; and
a male member that is correspondingly coupled to the female member, and is configured such that a plurality of insertion projections that are inserted into the plurality of insertion grooves in a crammed manner are formed at predetermined intervals on an outer circumferential surface of a second tubular body that is inserted into the hollow of the first tubular body and a second collar is integrally formed the second tubular body,
wherein extended inclined surfaces are formed on both rims of upper end portions of the plurality of insertion grooves to have widths that increase upward, and reduced inclined surfaces are formed on both edges of lower end portions of the plurality of insertion projections to have widths that decrease downward,
wherein the plurality of insertion grooves are formed to have widths that increase away from a center of the first tubular body, and the plurality of insertion projections that correspond to the plurality of insertion grooves are formed to have widths that increase away from a center of the second tubular body, and
wherein a plurality of spikes that are hammered into a target object integrally protrude from facing surfaces of the first and second collars.

6. A female-male combination type ornament comprising:
a female member that is configured such that a plurality of insertion grooves are formed at predetermined intervals in an inner circumferential surface of a hollow of a first tubular body and a first collar is integrally formed on the first tubular body; and
a male member that is correspondingly coupled to the female member, and is configured such that a plurality of insertion projections that are inserted into the plurality of insertion grooves in a crammed manner are formed at predetermined intervals on an outer circumferential surface of a second tubular body that is inserted into the hollow of the first tubular body and a second collar is integrally formed on the second tubular body,
wherein extended inclined surfaces are formed on both rims of upper end portions of the plurality of insertion grooves to have widths that increase upward, and reduced inclined surfaces are formed on both edges of lower end portions of the plurality of insertion projections to have widths that decrease downward, and
wherein, in order to prevent the male member from being axially separated and detached from the female member that is coupled to the male member, anti-detachment grooves are formed in inner surfaces of the plurality of insertion grooves and anti-detachment projections having wedge shapes that are inserted into the anti-detachment grooves are correspondingly formed on outer surfaces of the plurality of insertion projections that face the plurality of insertion grooves.

* * * * *